July 18, 1961 L. G. SCHOEN 2,992,621
RAILROAD TRAILER CAR AND TRAIN UNIT
Filed Aug. 8, 1955 2 Sheets-Sheet 1

INVENTOR
LOUIS G. SCHOEN
BY
*Mason & Graham*
ATTORNEYS

July 18, 1961     L. G. SCHOEN     2,992,621
RAILROAD TRAILER CAR AND TRAIN UNIT Filed Aug. 8, 1955     2 Sheets-Sheet 2

INVENTOR
LOUIS G. SCHOEN
BY
*Mason & Graham*
ATTORNEYS

United States Patent Office 2,992,621
Patented July 18, 1961

2,992,621
RAILROAD TRAILER CAR AND TRAIN UNIT
Louis G. Schoen, 4016B West Blvd., Los Angeles 8, Calif.
Filed Aug. 8, 1955, Ser. No. 526,976
11 Claims. (Cl. 105—4)

This invention has to do generally with railroad cars and particularly with special car equipment designed for use in transporting truck trailers or semitrailers.

In recent years there has been considerable interest in hauling less than carload lots of freight on railroads by transporting loaded truck trailers on railroad cars for a portion of the distance from the point of origin of the freight to it desination. In the last year or so there has been rapid growth in this type of traffic in spite of the fact that the railroads do not have special rolling stock for the purpose. It has been the practice to transport the truck trailers on railroad flatcars using various makeshift methods and equipment to secure the trailers on the cars and to load and unload them. Some of the disadvantages of using flatcars are: the loading and unloading has presented difficulties; there is much car space that is not utilized; and, considerable additional time, labor and accessory equipment is involved. Consequently the operations have not been as economical as desired.

Therefore, it is an object of my invention to provide novel and improved means for economically handling the above-described truck trailer railroad traffic.

A particufllar object is to provide a novel and improved railroad trailer car designed specifically for use in transporting truck trailers. In this connection it is an object to provide such a car which is designed to be coupled to other similar units and to cooperate therewith in a manner such that a truck trailer is supported partly on one such car and partly on another or on an auxiliary unit.

Another object is to provide a railroad trailer car which can be used in multiple units to accommodate a plurality of truck trailers and to provide such a car the effective length of which is adjustable to compensate for truck trailers of different lengths. It is also an object to provide such a car which can be coupled to standard railroad cars.

A further object of the invention is to provide a railroad trailer car unit upon which a truck trailer can be readily loaded or unloaded from either the end of the car or the side of the car.

Still another object is to provide a railroad trailer car of the type indicated which is relatively light in weight, is relatively inexpensive, and which requires less storage room than a conventional freight car.

These and other objects will be apparent from the drawings and the following description. Referring to the drawings.

Figure 1:
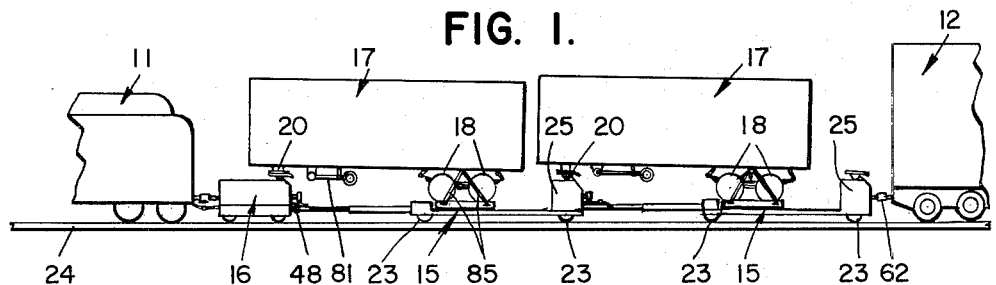
FIG. 1 is a side elevational view of a diagrammatic nature illustrating a portion of a train embodying the invention.

The drawings are in many respects diagrammatic in character, since the details of construction are not a part of the invention and such details can be supplied by anyone skilled in the art. More particularly describing the invention, in FIG. 1 I show a portion of a train embodying certain units of my invention. The train includes a locomotive 11 and a conventional boxcar 12 between which are two railroad trailer cars, designated by numeral 15, and an adapter truck or car, designated 16. The truck 16 and cars 15 are shown supporting two truck or highway trailers, indicated by 17. The truck trailers shown are what are commonly called semitrailers, that is, trailers having wheels 18 under the rear portion and the upper portion 20 of a so-called "fifth wheel" assembly under the forward portion.

Referring now to FIGS. 3 to 7 for a description of the construction of my railroad trailer car 15, this includes a frame or body, designated generally 22, which is shown provided with four flanged wheels 23 designed to ride on conventional railroad rails 24. By utilizing a relatively short body or frame 22 I may utilize wheels 23 which do not swivel or pivot about a vertical axis and yet have a car that will negotiate the sharpest curves found on standard railroads. At one end of the body 22 is an elevated or built-up section 25 which carries a support 26 of the type designed to receive and pivotally support the fifth wheel upper portion 20 or a highway trailer 17. The member 26 is pivotally mounted about a horizontal axis, indicated by 27, and may be spring-mounted although no springs are shown.

As will appear from FIG. 1, each truck trailer 17 is adapted to be supported upon two cars, that is, the forward portion of the truck trailer is supported upon one car 15, or upon an adapter truck 16, subsequently to be described, and the wheels of the trailer are adapted to be supported upon an adjacent car. For the latter purpose each car 15 is provided with a platform 30 which is mounted to swivel about a vertical axis. The platform is shown as having an upper deck 34, and a central tubular housing 35. The latter includes a depending pin 36 which is journaled in a bearing 37 mounted on the body or frame 22 of the car. The upper surface of the platform is formed to provide wheel wells or recesses 38 to cradle the wheels of a truck trailer. The platform may be provided with supporting casters 41 which bear upon the upper surface of a plate 42 forming part of the body 22.

The casing 35 telescopically receives a drawbar made up of the telescoping inner bar 45 and outer tube 46. The drawbar can be secured in adjusted position by pins 47 placed through selected ones of the holes 35', 45', 46' in members 35, 45, and 46, respectively. The bar 45 carries a coupling element 48 at its outer end.

The body 22 is formed to provide a stationary deck 50 adjacent but spaced from the platform and on a level with the upper surface thereof. A bridging plate 51, hinged at 52, is provided to span the gap between the deck 50 and the platform when loading or unloading a trailer from the end of the car. Slots 53 are provided in deck 50 for the purpose of hooking rams 54 temporarily thereto. Similar slots 55 are provided in the platform for the same purpose. Ramps may be used directly with the platform when the same is turned for loading or unloading a truck trainer from the side of the car.

The drawbar 45, 46 is adapted to be coupled to a coupling means 60 of an adjacent car. Thus each car carries a coupling means 60 which is mounted to pivot about substantially the same axis as the axis about which a truck trailer pivots when its fifth wheel plate assembly is resting upon and attached to the fifth wheel element 26. It will be apparent that the drawbar 45, 46 pivots with the platform 30 to enable the cars and their load to negotiate curved sections of track. While the amount of pivotal movement of the drawbar, when extended, is necessarily limited by the frame of the car, there is, nevertheless, ample pivotal movement for the purpose.

The section 25 of the car is provided with a standard railroad coupler, indicated by 62, so that the car also may be coupled to a standard car or locomotive.

The end or section 25 of the car may also be provided with a spring-winding reel 64 carrying an air hose 65 which may be pulled out for connection to the forward end of an adjacently coupled car. The hose may lead to suitable piping extending to the forward end of the car, but not shown. In this connection I contemplate that the car can be fitted with standard-type air brakes and air brake equipment. Also, the car body may be suitably spring-mounted with respect to the wheels.

Figure 2:
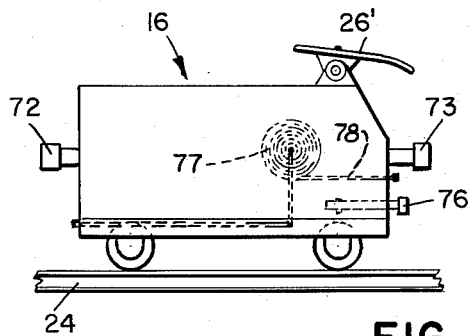
FIG. 2 is a side elevational view of an adapter truck.
Figure 3:
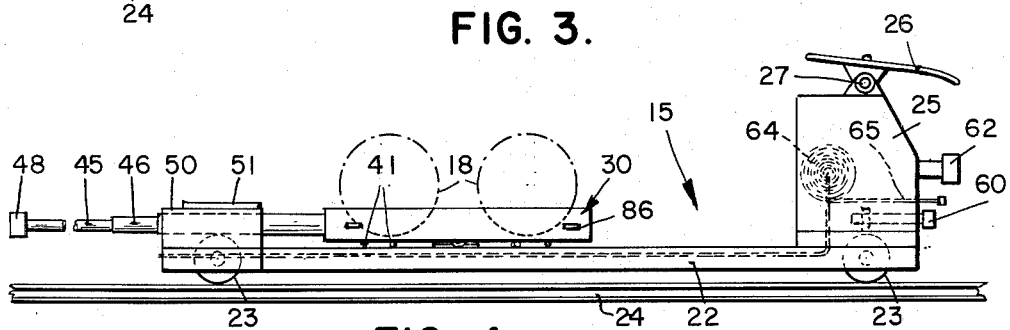
FIG. 3 is a side elevational view of a railroad trailer car embodying the invention.
Figure 4:
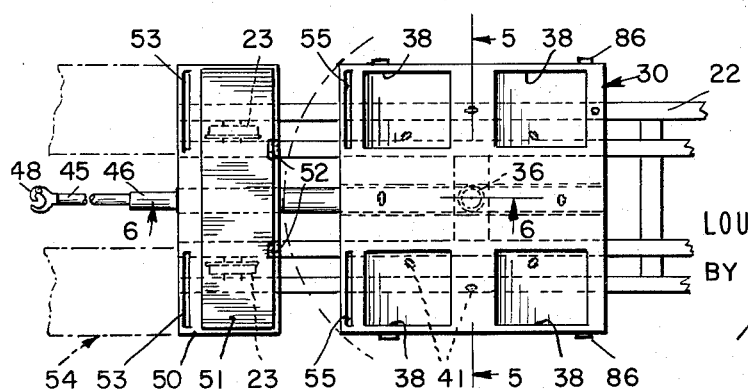
FIG. 4 is a partial plan view of a portion of the car of FIG. 3.
Figure 5:
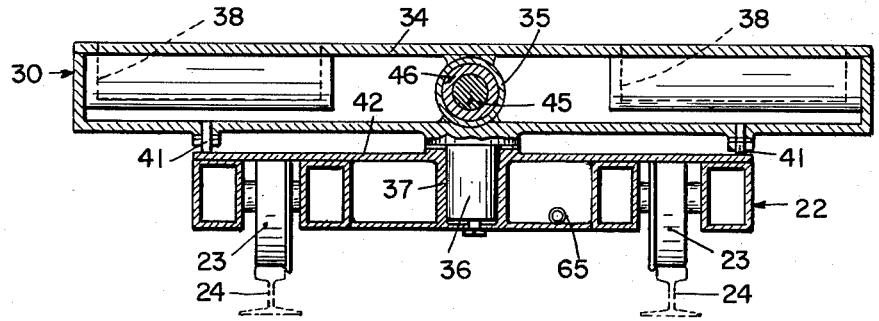
FIG. 5 is a sectional view on line 5—5 of FIG. 4, on a larger scale.
Figure 6:
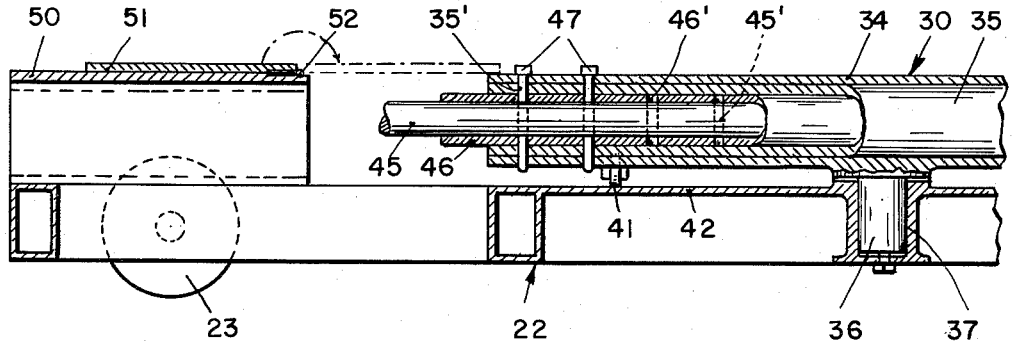
FIG. 6 is a fragmentary sectional view on line 6—6 of FIG. 4.

As will be apparent from FIG. 1, I provide a lead car or adapter truck 16 to which the foremost trailer car is coupled. This truck may be a conventional railway car or locomotive; however, it is shown as a special piece of equipment (FIG. 2) having a forward standard coupler 72 and a similar coupler 73 at its other end for the same purpose.

The adapter truck is fitted with a coupler 76 which serves as a means of detachably connecting the drawbar 45 of the foremost trailer car 15. Also, the adapter truck is fitted with the lower portion of a fifth wheel means, generally indicated by 26', for the purpose of supporting a trailer 17, the wheels of which are supported upon the foremost truck trailer car 15.

The adapter truck may carry conventional air brake equipment, and as a part of this I show a spring-retracted hose reel 77 carrying a hose 78 which can be extended as shown in FIG. 1 for connection to the air conduit terminating at the forward end of the adjacently coupled car 15.

In the use of the apparatus, ramps 54 are attached to the deck 50 and the plate 51 disposed to bridge the gap between the platform 30 and the deck 50. Then, with drawbar elements 45, 46 retracted, a trailer 17 may be backed onto the platform so that its wheels are cradled in the wheel wells thereof. Any suitable means may be provided to support the forward end of the trailer temporarily in elevated position before the truck tractor is driven away. By way of example, in FIG. 7 I show a temporary support 80 used in conjunction with the trailer dolly 81 for the purpose. The drawbar means 45, 46 is then extended to the proper length depending upon the size of the truck trailer and anchored by pins 47. The ramps then may be removed. The adapter truck, in the case of the first car 15, or a similar car 15 in the case of the others, is then backed into and coupled with the trailer car. During this operation the forward end of the trailer and its fifth wheel plate 20 rides up upon and is subsequently anchored to the fifth wheel element 26 or 26' as the case may be. The dolly 81 is then elevated, and the support 80 removed. Suitable holddown members of any desired nature, indicated by numeral 85, are attached to the body of the truck trailer and to the platform 30, to firmly anchor the truck trailer in place, the platform being provided with eyes 86 for this purpose.

Figure 7:
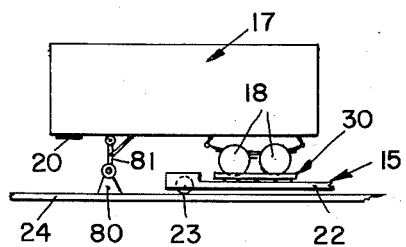
FIG. 7 is a diagrammatic view of a truck trailer supported in part on a trailer car and in part on a temporary support.

It will be apparent that to unload one of the truck trailers, the forward end of the trailer is supported independently of the cars, as in FIG. 7, and the leading train element uncoupled and pulled away from the particular trailer car. The drawbar means 45, 46 is then telescoped to fully housed position, and the ramps put in place. A truck tractor may then be backed under the forward end of the truck trailer and the latter lowered as by manipulating the dolly, so as to enable the attachment of the trailer to the tractor. If desired, the trailer may be driven off the side of the trailer by using the tractor to pivot the platform. When this is done the ramps are then attached to the platform before the trailer is pulled away.

Although I have illustrated and described a preferred form of my invention, I contemplate that various changes and modifications can be made therein without departing from the invention, the scope of which is indicated by the following claims.

I claim:

1. A railroad trailer car, comprising an elongated car body having rotatable railway track-engaging flanged wheels, supporting the same for movement over a railway track, a highway trailer support structure mounted on said car body at one end thereof and extending a substantial distance above said car body, means mounted on said support structure for pivotally supporting and releasably securing the forward end portion of a highway trailer, a highway truck trailer wheel-supporting platform mounted on said body for pivotal movement relative to said body about a vertical axis located between said support structure and the other end of said car body, and a drawbar rigidly affixed to said platform to pivot therewith having a car coupling element at its outer end and normally extending beyond the end of said car body adjacent said platform.

2. A railroad trailer car as set forth in claim 1 in which said drawbar is longitudinally adjustable whereby the effective length of same can be adjustably varied.

3. A railroad trailer car as set forth in claim 1 in which said drawbar comprises telescoping members receivable in said platform.

4. A railroad trailer car as set forth in claim 1 in which said car body is provided with car coupling means mounted at the end of said car body having said support structure and in which said car coupling means is mounted for pivotal movement about a vertical axis substantially coincident with the axis of pivotal support afforded a highway trailer by the means mounted on the support structure.

5. A railroad trailer car comprising an elongated car body having rotatable railway track-engaging flanged wheels supporting the same for movement over a railroad track, a highway trailer wheel-supporting platform mounted on said body for pivotal movement about a vertical axis, a drawbar rigidly affixed to said platform and extending beyond the adjacent end of said car body, and a railway car coupler means mounted on the end of said drawbar.

6. In a railroad car for transporting highway trailers, said car having a body supported upon railway track-engaging wheels, support means at one end of said body for pivotally supporting the forward part of a highway trailer the rear portion of which is supported upon an adjacent car, a highway trailer wheel-supporting platform means mounted on said body to swivel about a vertical axis located between said one end of said body and the other end thereof, a drawbar means rigidly mounted on said platform means to swivel therewith and extending beyond said other end of the car body for coupling the car to an end-adjacent railway unit, and coupling means carried by said car body at said one end thereof for detachably securing the same to another end-adjacent railway unit.

7. A railroad trailer car as set forth in claim 6 in which said drawbar means comprises telescoping members receivable in said platform means and means for locking said telescoping members in adjusted position.

8. A railroad trailer car as set forth in claim 6 in which said body is provided at said one end with a standard railroad coupling means mounted to pivot about a vertical axis coincident with the axis of pivotal support afforded the forward part of a highway trailer by said support means.

9. In a railroad train, means for transporting highway trailers of the type having a fifth wheel element adjacent one end and wheels adjacent the other end, comprising a railroad car having a platform mounted to swivel about a vertical axis for supporting the wheels of a given highway trailer and having a drawbar means rigidly attached to said platform to swivel therewith and extending beyond the end of the car, and an end-adjacent car unit coupled to the drawbar means of said railroad car and having a support for the fifth wheel element of the said given highway trailer.

10. In a railroad train, means for transporting highway trailers of the type having a fifth wheel element adjacent one end and wheels adjacent the other end, comprising a plurality of railroad cars each having a platform mounted to swivel about a vertical axis for supporting the wheels of a truck trailer and each having a support for the fifth wheel element of a trailer the wheels of which are supported on an end-adjacent car, said platform and said support being spaced longitudinally of the car, and means coupling said cars together in end to end relation, said means including a drawbar rigidly mounted on and extending from the platform of one car to the relatively opposite end of the next adjacent car, said cars being similarly disposed.

11. In a railroad train, means for transporting highway trailers of the type having a fifth wheel element adjacent one end and wheels adjacent the other end, comprising a plurality of railroad trailer cars each having an elevated support at one end for the fifth wheel element of a highway trailer the wheels of which are supported on an adjacent trailer car and each having a pivotally mounted platform for supporting the wheels of a highway trailer which extends over and is partially supported upon an adjacent trailer car, means coupling said cars together in end to end relation including a drawbar on each car rigidly mounted on the platform of the car and detachably secured to the said one end of the adjacent forward car, and an adapter car ahead of the foremost trailer car having a standard railroad coupler at one end and having means at its other end for detachably securing the drawbar of said foremost trailer car.

References Cited in the file of this patent
UNITED STATES PATENTS

| | | |
|---|---|---|
| 1,994,815 | Ferrin | Mar. 19, 1935 |
| 2,036,535 | Nelson | Apr. 7, 1936 |
| 2,118,364 | Sheehan | May 24, 1938 |
| 2,121,181 | Bayerl | June 21, 1938 |
| 2,204,667 | Dooley et al. | June 18, 1940 |
| 2,638,852 | Bannen | May 19, 1953 |
| 2,708,887 | Van Alstine | May 24, 1955 |

OTHER REFERENCES

"Railway Age," pp. 35–37, May 31, 1954. (Copy in Patent Office Scientific Library.)

UNITED STATES PATENT OFFICE
CERTIFICATE OF CORRECTION

Patent No. 2,992,621            July 18, 1961

Louis G. Schoen

It is hereby certified that error appears in the above numbered patent requiring correction and that the said Letters Patent should read as corrected below.

Column 2, line 58, for "rams" read -- ramps --; line 62, for "trainer" read -- trailer --; column 3, line 71, after "trailer" insert -- car --.

Signed and sealed this 30th day of June 1964.

(SEAL)
Attest:

ERNEST W. SWIDER
Attesting Officer

EDWARD J. BRENNER
Commissioner of Patents